(12) United States Patent
Hassan et al.

(10) Patent No.: US 12,351,702 B2
(45) Date of Patent: Jul. 8, 2025

(54) COMPOSITIONS AND METHODS FOR PRODUCING ELECTRICALLY CONDUCTIVE COORDINATION POLYMERS AND USES THEREOF

(71) Applicants: Mohamed H. Hassan, Potsdam, NY (US); Emanuela Silvana Andreescu, Potsdam, NY (US)

(72) Inventors: Mohamed H. Hassan, Potsdam, NY (US); Emanuela Silvana Andreescu, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 147 days.

(21) Appl. No.: 17/981,923

(22) Filed: Nov. 7, 2022

(65) Prior Publication Data

US 2024/0018310 A1 Jan. 18, 2024

Related U.S. Application Data

(60) Provisional application No. 63/276,589, filed on Nov. 6, 2021.

(51) Int. Cl.
*C08K 5/378* (2006.01)
*B32B 5/22* (2006.01)
(Continued)

(52) U.S. Cl.
CPC .............. *C08K 5/378* (2013.01); *B32B 5/22* (2013.01); *B32B 25/04* (2013.01); *C08G 83/001* (2013.01);
(Continued)

(58) Field of Classification Search
CPC ........ C08G 83/00; C08G 83/001; C08K 3/28; C08K 5/378; B32B 5/22; B32B 25/04;
(Continued)

(56) References Cited

U.S. PATENT DOCUMENTS 2,890,150 A * 6/1959 Baldwin .............. C07D 235/28
514/184
2009/0274965 A1* 11/2009 Wu .................. G03G 5/061443
430/58.5

(Continued)

FOREIGN PATENT DOCUMENTS

CN 113336708 A * 9/2021

*Primary Examiner* — John D Freeman
(74) *Attorney, Agent, or Firm* — Bond, Schoeneck & King PLLC; George R. McGuire

(57) ABSTRACT

Compositions, methods and processes for producing an electrically conductive metal-organic material is disclosed, wherein the material is based on a coordination polymer consisting of a plurality of ligands and metal ions, each coordinated with a ligand to impart conductivity to the material. Further provided are methods of deposition and use to produce conductive textiles, stretchable, flexible and transparent devices and surfaces. The electrically conductive metal-organic material may be used in a variety of fields including wearable electronics, sensors (gas, wearable, sweat, temperature, humidity), batteries, supercapacitors, electronic and pressure sensitive textiles/cotton/paper, electromagnetic shielding fabric, triboelectric nanogenerators, conductive paints/inks, antistatic coatings, conductive spray for flexible, transparent, and pressure sensitive glass/elastomers/plastics.

17 Claims, 19 Drawing Sheets

(51) Int. Cl.
*B32B 25/04* (2006.01)
*C08G 83/00* (2006.01)
*C08K 3/28* (2006.01)
*C09D 5/24* (2006.01)

(52) U.S. Cl.
CPC .................. *C08K 3/28* (2013.01); *C09D 5/24* (2013.01); *B32B 2255/02* (2013.01); *B32B 2255/10* (2013.01); *B32B 2255/24* (2013.01); *B32B 2262/0207* (2013.01); *B32B 2307/202* (2013.01); *B32B 2437/00* (2013.01)

(58) Field of Classification Search
CPC ............ B32B 2255/02; B32B 2255/10; B32B 2255/24; B32B 2262/0207; B32B 2307/202; B32B 2437/00; C09D 5/24
See application file for complete search history.

(56) References Cited

U.S. PATENT DOCUMENTS

| | | | |
|---|---|---|---|
| 2015/0037517 A1* | 2/2015 | Buriak | B05D 1/02 |
| | | | 427/108 |
| 2017/0152438 A1* | 6/2017 | Torres Cano | C08G 83/001 |
| 2019/0111410 A1* | 4/2019 | Vallejo Sánchez | B01J 20/3071 |
| 2021/0230191 A1* | 7/2021 | Mirica | C07F 1/08 |

* cited by examiner

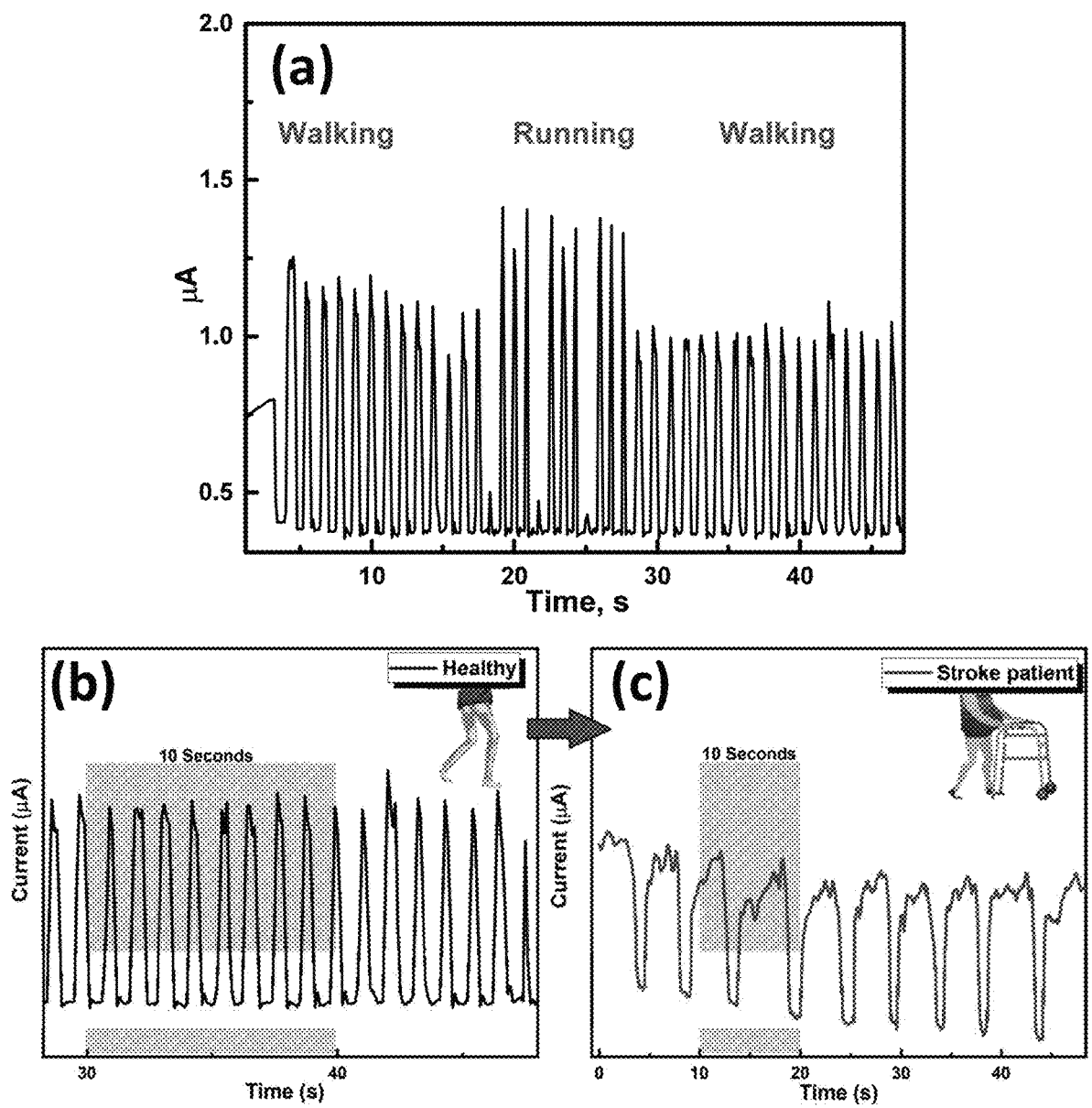
FIG. 10A-C

COMPOSITIONS AND METHODS FOR PRODUCING ELECTRICALLY CONDUCTIVE COORDINATION POLYMERS AND USES THEREOF

CROSS-REFERENCE TO RELATED APPLICATIONS

This application claims priority to U.S. Provisional Patent Application Ser. No. 63/276,589, filed on Nov. 6, 2021, and entitled "COMPOSITIONS AND METHODS FOR PRODUCING ELECTRICALLY CONDUCTIVE COORDINATION POLYMERS AND USES THEREOF," the entire disclosure of which is incorporated herein by reference.

FIELD OF THE INVENTION

The present disclosure is directed generally to compositions, methods and processes for producing an electronically conductive material comprising at least one ligand and a plurality of metal ions, each coordinated with a ligand to impart conductivity to the material.

BACKGROUND OF THE INVENTION

Metal-organic materials such as non-porous coordination polymers (CPs) and metal-organic frameworks (MOFs) are a class of extended solid-state structures composed of metal ion centers linked by infinite array of organic ligands (linkers). The development of such materials was based on the fundamental understanding of the structure and properties of the early discovered coordination complexes in late 1800s. For instance, Prussian blue $Fe_4[Fe(CN)_6]_3$ as a 3D porous structure and Hofmann Clathrate $[Ni(CN)_2(NH_3)] \cdot C_6H_6$ as a 2D layered structure are two of the early discovered coordination compounds. John C. Bailar was the first person who defined the term "coordination polymers (CPs)" in 1964 to distinguish that class of materials form organic polymers. CPs term is usually associated with materials having an extended metal-ligand connected via coordinate bonds regardless of their architecture, dimensionality, or final structure. On the other hand, MOFs are a class of crystalline materials that are often based on utilizing rigid linkers to connect metal ions or clusters to form one, two, or three-dimensional porous structures with defined morphology. As the final architecture and dimensionality of these materials are defined by the geometry of the building blocks, the careful selection of these building blocks leads to the development of solid-state materials with extraordinary characteristics.

Electrical conductivity in conductive polymers and metal organic materials is a rare physical property that, once found, opens promising potentials for applications that rely primarily on the charge transport though the material such as sensing, electrocatalysis, energy storage devices, flexible electronics, and others.

The electronic structure and charge transport mechanism in such materials are highly dependent on their chemical structure and composition. Generally, the charge transport mechanism in solid materials can be described as band-like transport and hopping transport. The latter is usually thermally activated and describes "jumping" of charge carriers between localized electronic states at discrete sites. The former describes the flow of charge carriers through a continuous energy bands formed due to the strong interaction between adjacent sites.

For a material to acquire a good electrical conductivity, the mobility ($\mu$) and density (n) of the electrons (e) and holes (h) need to be high enough. This can be attained by the presence of a large number of loosely bound charge carriers. The charge mobility describes the ability of a material to transport charges.

$$\sigma = e(\mu_e n_e + \mu_h n_h)$$

Due to the stability differences and anisotropy between various materials, it is of great importance to measure their electrical conductivity properly and accurately. Generally, the electrical conductance (G) can be measured by fitting the linear range in the I-V curve, and with considering the length (L) and area (A) of the conduction channel (area between the electrode contacts), the electrical conductivity can be calculated.

$$G = I/V$$

$$\sigma = GL/A$$

The electrical conductivity of crystals, polycrystalline powders, and films is measured by different methods including two-contact probe, four-contact probe, four-point probe and van der Pauw methods. Single crystals are the best to accurately report the electrical conductivity due to the lack of grain boundaries that contribute to the resistance. However, single crystals of some polymeric materials are challenging to obtain. Thus, polycrystalline powder can be pressed as a pellet rigid enough to hold the electrical contacts and resist the strain that originates during paste drying without cracking. In the two-probe contact method, a rectangular piece of the pellet with well-defined dimensions is usually cut with a sharp blade, and then thin metal wires are fixed on the opposite sides of one surface using conductive adhesive paste. These wires are then connected to the leads of the digital multimeter to measure the total resistance of the setup (sample+contacts+wires). This method is more suitable for materials with high resistance (>1 K$\Omega$) because the resistance of the contacts and wires are usually <100$\Omega$. However, if the conductivity of the material is high enough with a resistance value equal to or lower than the resistance of the contacts and wires, the four-contact probe method should be used. Here, four thin metal wires are fixed in parallel on the pellet surface using a conductive paste, where the outer contacts source current and the inner ones measure the voltage. The advantage of this method is that it does not depend on the resistance of the contacts and wires. 4-point probe and van der Pauw methods are frequently used to measure the electrical conductivity of samples with irregular shapes. Both methods exclude the resistance of the contacts and wires from the final resistance reading of the sample.

The discovery of novel conductive materials with unique properties enables a variety of applications and devices in many fields of smart electronics such as health monitors, e-skin, implantable devices, and tactile sensors.

In order to fulfil the requirement for diverse market, the flexibility, stretchability and the ease of functionality need to be integrated in such devices. To achieve this goal, new electrically conductive materials with the aforementioned features are needed for such applications. These features include: enhanced mechanical deformability, excellent chemical stability, optical transparency, low cost of manufacturing, and the ease of large-area processing. In addition, the nature and morphology of the conductive CP determine which application/device they can be integrated with. For instance, granular and microparticle based materials are not suitable for integration in textiles or other flexible substrates because they can easily leach with any mechanical deformation and their grain boundary could result in variable and non-reversible changes in the electrical conductivity. Materials that do not cause skin irritation and have water resistant properties are more suitable for skin-attachable sensors.

With the progress in miniaturization, electronic textiles and wearable technologies, demand for flexible conductive materials is growing. In the market of electronic textiles for example, one of the largest electronic components demand is for conductive materials that are flexible and can be easily incorporated within fabrics or textiles. The planar rigid structure of traditional conductive materials makes it difficult to interface with the soft nature of textiles or biological tissues.

Current commercial conductive materials, e.g., silver or stainless steel threads, are used primarily to wire wearable electronic gadgets attached to textiles. However, their mechanical rigidity, color, and lack of extra functionality limit their use for advanced applications.

Because of the problems mentioned above, a new approach for producing new flexible conductive materials and colorless conductive threads is required.

This invention discloses a new conductive coordination polymer that has a nanofibrous morphology and forms an entangled network to help reducing circuit damage originating from cracking during stretching/bending, This material is flexible, conductive, and can be easily integrated in a variety of platforms, devices and applications such as flexible and wearable electronics, batteries, supercapacitors, etc. The material provides advantages that are essential in developing the next generation electronic textiles, devices, sensors and coatings at large scale and a very low cost.

Accordingly, there is a need in the art for a conductive material that is optically transparent when applied to flexible and solid surfaces.

SUMMARY

It is therefore a principal object and advantage of the present invention to provide a conductive material that is optically transparent when applied to flexible and solid surfaces.

It is another objective and advantage of the present invention to provide a system and composition that is attached, grown, deposited or sprayed on surfaces to impart conductivity to that substrate.

It is another objective and advantage of the present invention to provide a method or producing electrically conductive coordination polymer microwires.

It is yet another objective and advantage of the present invention to provide formulations and methods to produce colorless electronic coatings for e-textiles and methods of use in a variety of fields including but not limited to sensing, electronic textiles, wearables, supercapacitors, conductive paints, inks and antistatic coatings.

In some embodiments, a method of synthesizing a coordination polymer (ML), whereas the L is a thiolated or selenated ligand coordinated with a plurality of metal (M) ions, each coordinated with at least one ligand comprising a set of thiolated or selenated functional groups to form an extended M-L network to impart conductivity to the material.

In some embodiments, a method of depositing, growing, printing or spraying a composition consisting of the synthesized coordination polymer, ML, is given to illustrate methods and processes for the incorporation of this material in devices, apparatus, systems and applications.

In some embodiments, one of the synthesized coordination polymers called MH-41 is described that can be sprayed on any surface rendering it electrically conductive and pressure sensitive, providing a unique advantage for pressure sensitive textiles and electronic technologies.

In some embodiments, a colorless soft conductive thread and pressure sensitive platform is described that can be interfaced with human skin or textiles.

In some embodiments, a gas responsive material based on MH-41 is described as a gas sensing platform.

The present disclosure is directed to compositions, methods and processes for producing an electronically conductive material comprising of at least one ligand and a plurality of metal ions, each coordinated with a ligand to impart conductivity to the material. Further provided are methods of impregnation to produce conductive textiles, stretchable and transparent devices and surfaces. More specifically, the invention relates to a new conductive coordination polymers used to fabricate transparent, flexible and electrically conductive materials and to their use in a variety of applications including: wearable electronics, sensors (gas, wearable, sweat, temperature, humidity), batteries, supercapacitors, electronic and pressure sensitive textiles/cotton/paper, electromagnetic shielding surfaces/fabrics, triboelectric nanogenerators, conductive paints/inks, antistatic coatings, conductive spray for flexible, transparent, and pressure sensitive glass/elastomers/plastics.

According to an aspect, the invention is an electrically conductive material, comprising a substrate and a plurality of thiolated or selenated ligands coordinated with a plurality of metal ions applied to the substrate, wherein each of the plurality of metal ions is coordinated with at least one of the plurality of ligands to form a conductive fiber network on the substrate. The plurality of thiolated or selenated ligands may be 2-mercaptobenzimidazole, 5-amino-2-mercaptobenzimidazole, 2-mercaptoimidazole, or 2-mercaptopyrimidine. The metal ion may be $MG^{2+}$, $Mn^{2+}$, $Fe^{2+}$, $Co^{2+}$, $Ni^{2+}$, $Cu^{2+}$, $Cu^+$, $Pd^{2+}$, $Pt^{2+}$, $Ru^{2+}$, $CD^{2+}$, $Zn^{2+}$, $Pb^{2+}$, $Hg^{2+}$, $V^{2+}$, $Cr^{2+}$, or $Ni^{2+}$. The metal ion may also be $Fe^{3+}$, $V^{3+}$, $Ti^{3+}$, $Sc^{3+}$, $Al^{3+}$, $In^{3+}$, $Ga^{3+}$, $Mn^{3+}$, $Co^{3+}$, $Bi^{3+}$ or $Cr^{3+}$. The plurality of thiolated or selenated ligands may be 2-mercaptobenzimidazole (2-MBI) and the plurality of metal ions may be copper ions. The substrate may be a layer of an elastomer with the conductive fiber network is applied to a surface of the elastomer and a second elastomer is applied over the conductive fiber network. The substrate may be a textile fiber. A first conductive lead may be attached to a first end of the substrate and in contact with the conductive fiber network and a second conductive lead attached to a second end of the substrate and also in contact with the conductive fiber network. A detector may be coupled to the first conductive lead and the second conductive lead to detect any changes in the electrical conductivity of the conductive fiber network. The electrical conductivity of the conductive fiber network will change in response to contact between the conductive fiber network and a gas, in response to motion, in response to pressure, or in response to contact with a fluid.

In another aspect, the invention is a method of producing an electrically conductive material. One step involves providing a plurality of thiolated or selenated ligands. Another step involves coordinating a plurality of metal ions to the plurality of thiolated or selenated ligands to form a conductive fiber network. A further step involves applying the conductive fiber network to a substrate. The plurality of thiolated or selenated ligands may be selected from the group consisting of 2-mercaptobenzimidazole, 5-amino-2-mercaptobenzimidazole, 2-mercaptoimidazole, and 2-mercaptopyrimidine. The substrate may be a layer of an elastomer with the conductive fiber network applied to a surface of the elastomer and a second elastomer applied over the conductive fiber network. The substrate may be a textile fiber. The method may further include the step of measuring the electrical conductivity of the conductive fiber network.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIG. 10A-C are graphs of amperometric measurements of the wearable device tracking walking/running patterns in a healthy individual compared to the one generated form a stroke patient.

DETAILED DESCRIPTION OF EMBODIMENTS

The present disclosure describes compositions, methods and processes for producing an electronically conductive material comprising of at least one ligand and a plurality of metal ions, each coordinated with a ligand to impart conductivity to the material. In some embodiments, ML comprising a plurality of ligands and a plurality of metal ions is given. The metal ions is coordinated with at least one organic ligand, as described in the summary of the invention.

Figure 1:
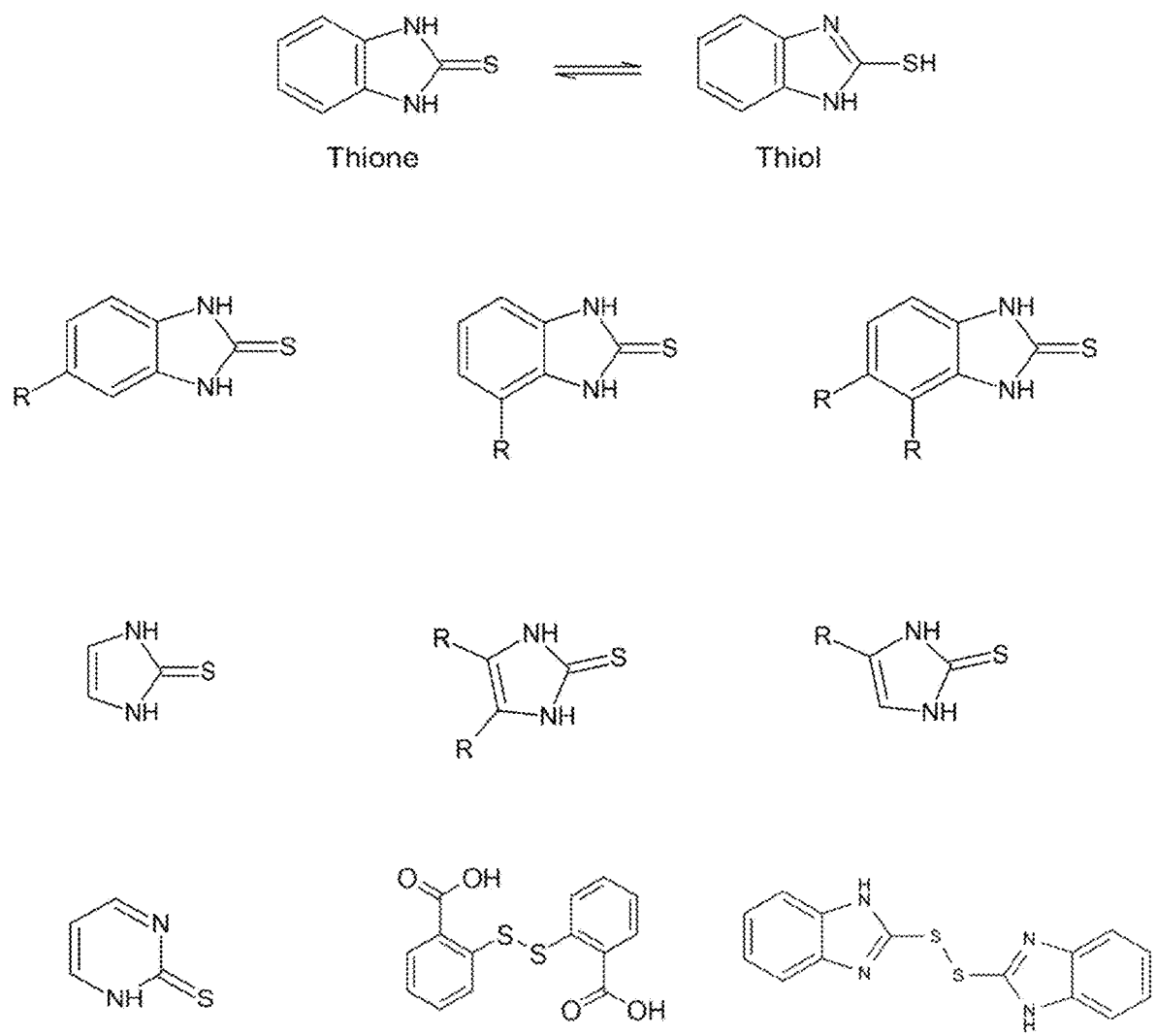
FIG. 1 is a non-limiting example of L for producing the conductive ML, according to some embodiments. On the structures presented each R can be the same or different and is selected from the group consisting of hydrogen, $NO_2$, R', F, Cl, Br, I, CN, NC, $SO_3R'$, $SO_3H$, OR', OH, SR', SH, $PO_3R'$, $PO_3H$, $CF_3$, $CH_3$, $CO_2H$, $NR'_2$, NHR', and $NH_2$; and each R' is the same or different and is optionally substituted alkyl or optionally substituted aryl, in accordance with an embodiment.
Figure 2:
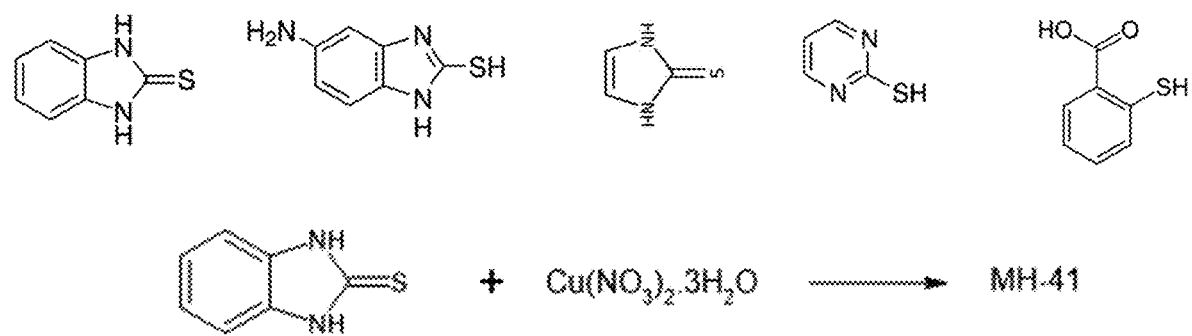
FIG. 2 is a non-limiting example of L coordinated with copper ion, showing (from left to right) 2-mercaptobenzimidazole, 5-amino-2-mercaptobenzimidazole, 2-mercaptoimidazole, 2-mercaptopyrimidine, thiosalicylic acid, and the bottom image shows the solvothermal synthesis of MH-41 as an example of ML, in accordance with an embodiment.

In some embodiments, the (L) ligands are from a family such as 2-mercaptoimidazole, thiosalicylic acid, dithiosalicylic acid, 2-mercaptopyrimidine, 5-amino-2-mercaptobenzimidazole, 2 2'-dithiobis(benzimidazole), and others, among the list represented in FIG. 1 and FIG. 2 wherein each R is the same or different and is selected from the group consisting of hydrogen, $NO_2$, R', F, Cl, Br, I, CN, NC, $SO_3R'$, $SO_3H$, OR', OH, SR', SH, $PO_3R'$, $PO_3H$, $CF_3$, $CH_3$, $CO_2H$, $NR'_2$, NHR', and $NH_2$; and each R' is the same or different and is optionally substituted alkyl or optionally substituted aryl.

FIG. 2 (bottom) shows 2-mercaptobenzimidazole (2-MBI) reacting with copper salt to form an electrically conductive material (MH-41) as an example of ML.

In some embodiments, a method of producing a fibrous conductive polymer network is provided comprising a plurality of metal ions coordinated to a plurality of thiolated or selenated ligands to form a conductive network.

Any suitable metal ion may be employed. Each metal ion may be a monovalent, divalent, or trivalent. In some embodiments, each metal ion is a monovalent metal ion. Non-limiting examples of monovalent metal ions are $Ag^+$, $Cu^+$, and $Au^+$. In some cases, the metal ion is $Cu^+$. In some embodiments, the metal ion is a divalent metal ion. Non-limiting examples of divalent metal ions are $MG^{2+}$, $Mn^{2+}$, $Fe^{2+}$, $Co^{2+}$, $Ni^{2+}$, $Cu^{2+}$, $Cu^+$, $Pd^{2+}$, $Pt^{2+}$, $Ru^{2+}$, $CD^{2+}$, $Zn^{2+}$, $Pb^{2+}$, $Hg^{2+}$, $V^{2+}$, $Cr^{2+}$, or $Ni^{2+}$. In some cases, the metal ion is $Ni^{+2}$. In some cases, the metal ion is $Cu^{2+}$. In some embodiments, the metal ion is a trivalent metal ion. Non-limiting examples of trivalent metal ions are $Fe^{3+}$, $V^{3+}$, $Ti^{3+}$, $Sc^{3+}$, $Al^{3+}$, $In^{3+}$, $Ga^{3+}$, $Mn^{3+}$, $Co^{3+}$, $Bi^{3+}$ and $Cr^{3+}$. In some embodiments, a coordination polymer may comprise two or more metal ions having a different valency. For example, the coordination polymer may comprise one or more monovalent metal ion and one or more divalent metal ion. In some such embodiments, the one or more ligand may be redox active and/or able to accommodate the different redox states of the metal ion. In some embodiments, the one or more metal ions may be the same metal ion but in different redox states (e.g., $Cu^+$ and $Cu^{+2}$).

Any suitable solvent or a mixture of solvents are used in the synthesis methods described in the examples. Non-limiting examples of solvents include, dimethylformamide (DMF), diethylformatnide, di methyl sulfoxide, formamide, ethanol, methanol, water, toluene, xylene, henzonitrile, acetamide, dimethylacetamide, 1,3-Dimethyl-2-imidazolidinone, isopropyl alcohol, pyridine, benzene, diethyl ether, petroleum ether, glycol, chloroform, methylene chloride, p-cresol, pentane, hexane, cyclohexane, tetrahydrofuran, ethyl acetate, carbon tetrachloride, triethylamine, picoline, methylene chloride, dioxane, mesitylene, or mixtures.

The synthesis described herein may be performed at any suitable temperature. In some cases the reaction is carried out at temperatures between 20° C. and 25° C., or between 60° C. and 85° C., or between 45° C. and 95° C., or between 25° C. and about 100° C., or between 95° C. and 160° C., or between 150° C. and 200° C.

The synthesized coordination polymers described herein can be applied to surfaces by means of dip coating, spin coating, spray coating, roll coating, screen printing, drop-casting, ink-jet, in situ impregnation methods. Substrates may comprise textiles, wood, plastic, glass, carbon electrodes, silicon wafers, indium-tin oxide coated glass, etc.

The synthesized coordination polymers described herein may be utilized in various applications. Non-limiting examples of such applications include electrochemical catalysis, electrochemical sensors, physical sensors, semiconductors, heterogeneous catalysis, supercapacitors, batteries, light-emitting diodes, electromagnetic shielding, solar cells, triboelectric nanogenerators, conductive paints/inks, and antistatic coatings, etc.

In some embodiments, the synthesized coordination polymers described herein is dried and pressed as a pellet which comprises electrical conductivity value of at least 0.1 mS·cm$^{-1}$, or from 0.5 S·cm$^{-1}$ to 1 S·cm$^{-1}$, or from 1 S·cm$^{-1}$ to 2 S·cm$^{-1}$, or above 2 S·cm$^{-1}$.

MH-41 may be doped with redox active metal by dispersing a suitable amount of the polymer in one of the previously described solvents with an equivalent amount of any metal salt described before under stirring for at least 1 hour.

Figure 3:
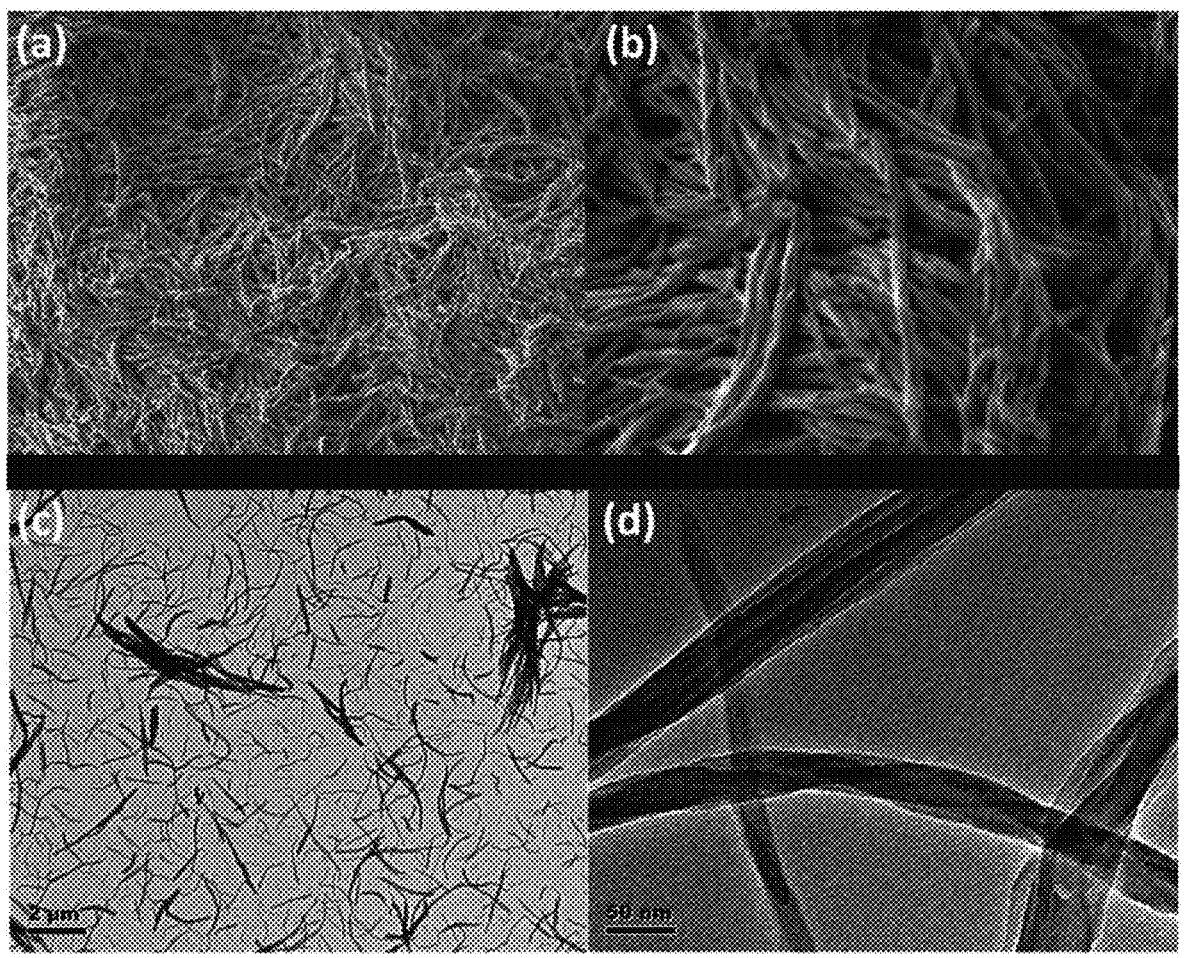
FIG. 3 is a series of SEM (a,b) and TEM (c,d) images of example of MH-41 fibers, in accordance with an embodiment.
Figure 4A:
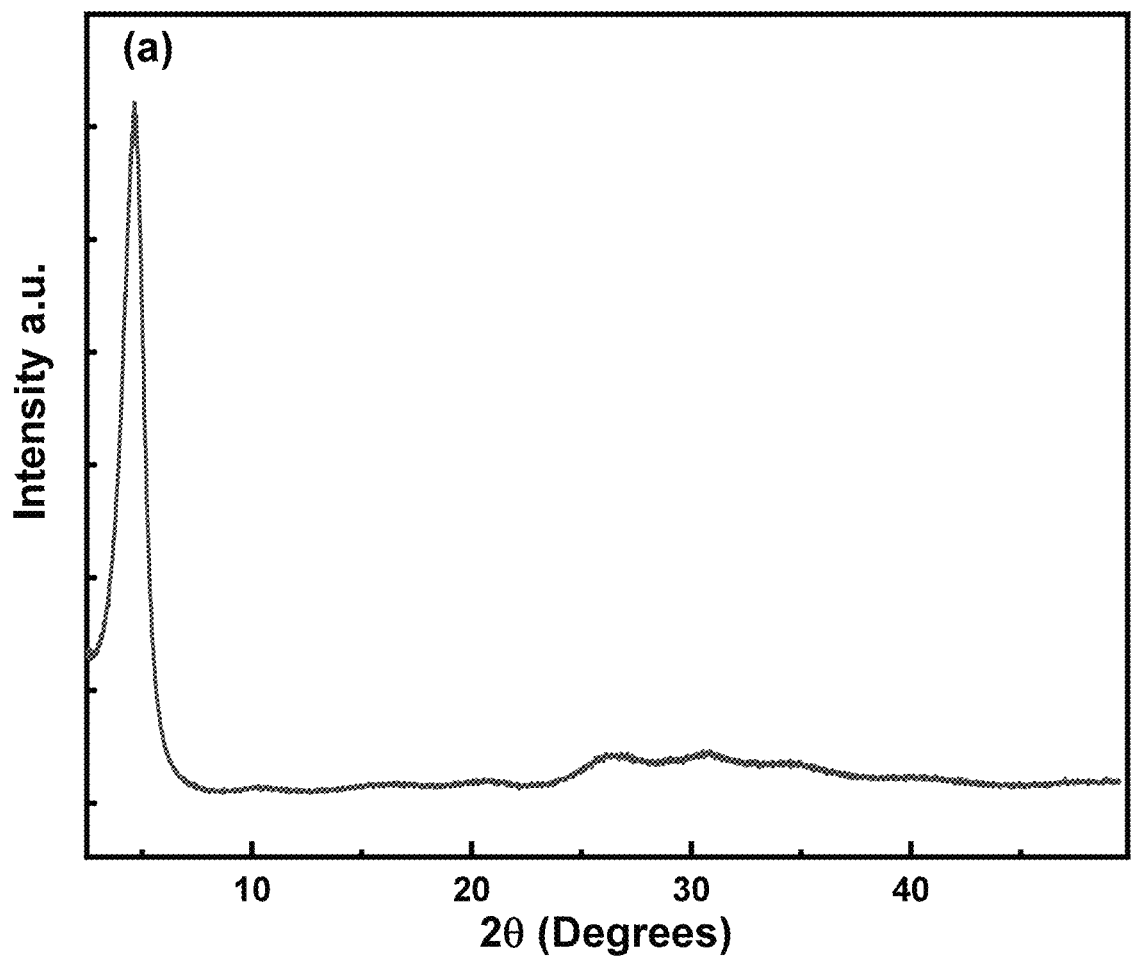
FIG. 4A is a PXRD pattern of MH-41 in accordance with an embodiment.
Figure 4B:
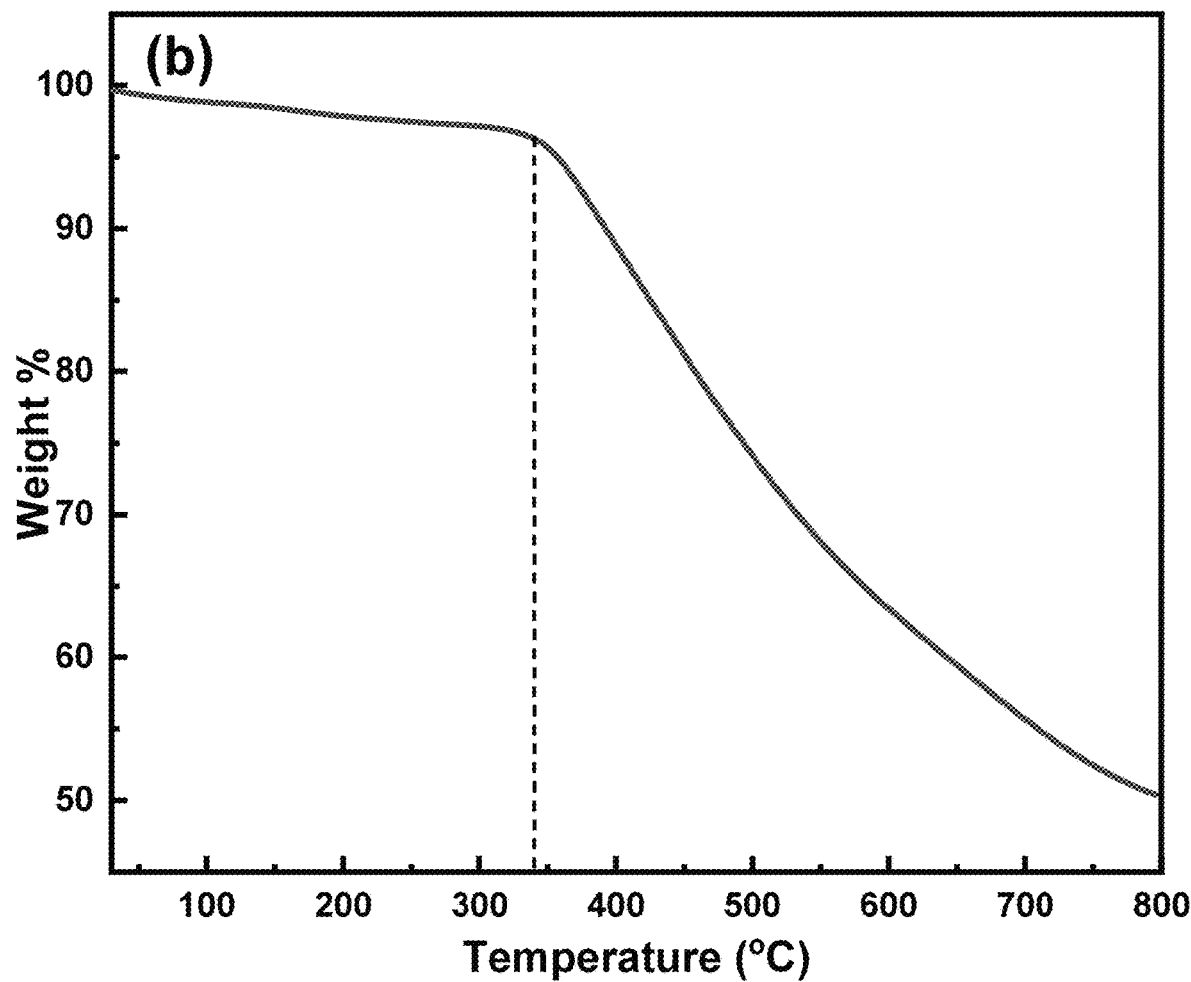
FIG. 4B is a TGA analysis of MH-41 in accordance with an embodiment.

Scanning Electron Microscope (SEM) images as seen in FIG. 3 revealed a microfibrous morphology of this material which explains the ease of formation of free-standing films via microfibers bundles entanglement. Transmission Electron Microscope (TEM) images show that the fibers form 2-4 micrometer long bundles. No crystalline domains can be seen in the TEM images, which is reflected on the powder X-ray diffraction (PXRD) pattern. The PXRD contains only one sharp peak at 2θ=5.6° and other small humps indicating the amorphous nature of this material as seen in FIG. 4A. The Thermogravimetric analysis (TGA) shown in FIG. 4B demonstrates the high thermal stability of MH-41 which starts to degrade after 340° C. This high stability threshold is helpful for integrating this material in devices that function at elevated temperatures. The surface area and porosity were examined revealing a non-porous structure with the surface area of 74.5 m$^2$·g$^{-1}$.

Figure 5A:
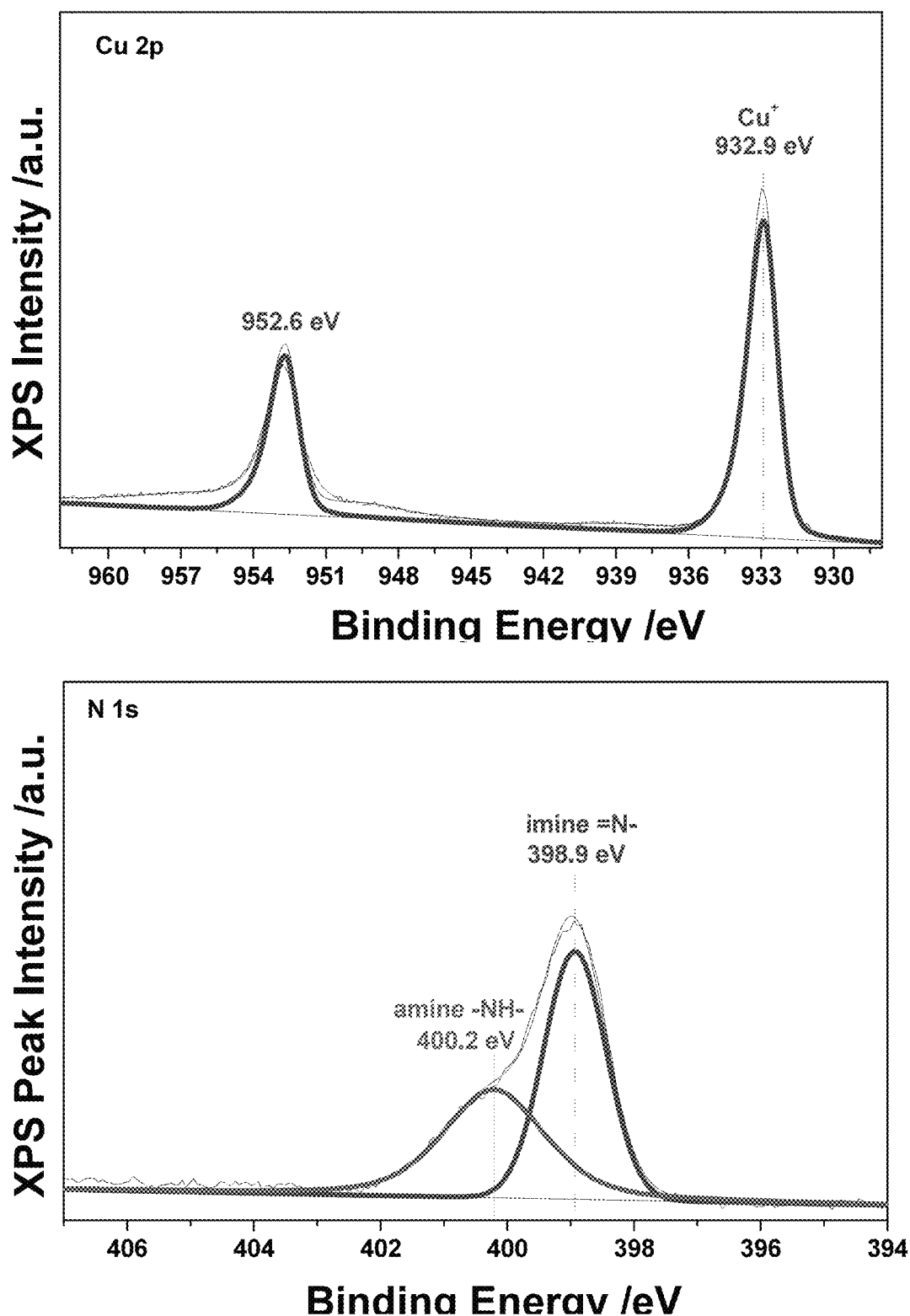
FIG. 5A is a pair of graphs of the XPS of Cu 2p and N 1s core level spectra in accordance with an embodiment.
Figure 5B:
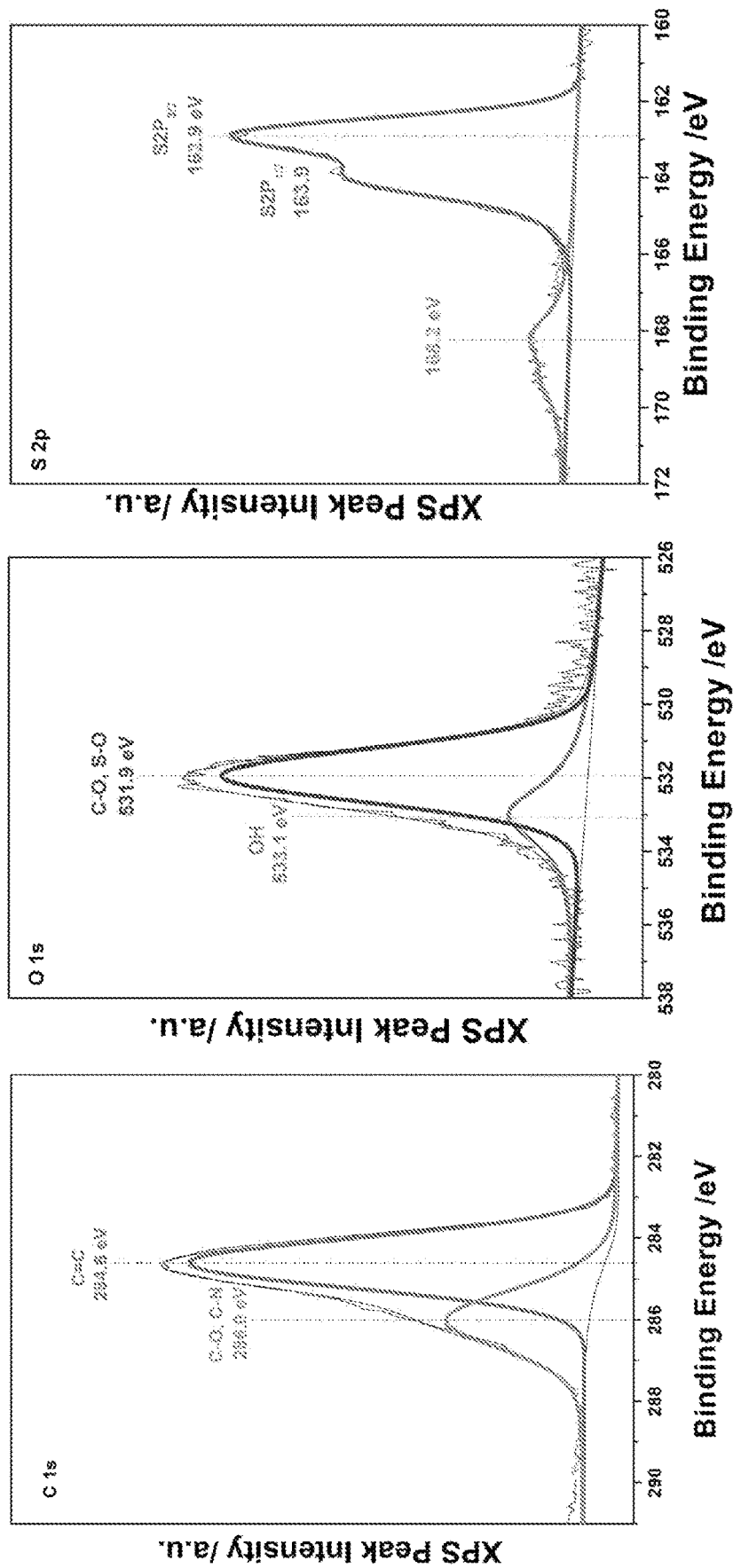
FIG. 5B is a series of graphs of the XPS of C1s, O1s, and S 2p core level spectra, in accordance with an embodiment.

The chemical composition of MH-41, as an example, shows the oxidation state of copper. X-ray photoelectron spectroscopy (XPS) and elemental analysis of FIG. 5A and 5B reveals the XPS core level spectrum of the Cu 2p region and the presence of Cu2p$_{3/2}$ and Cu2p$_{1/2}$ at 932.9 eV and 952.6 eV, respectively. The presence of these two peaks at the observed locations indicates that the oxidation state of Cu is +1. Also, the absence of observable Cu$^{2+}$ satellite features at around 943 eV confirms the previous observation or Cu$^{2+}$ might be present in trace quantities. Nitrogen 1S region revealed that the two N atoms of 2-MBI are in two different chemical environments due to the formation of Cu—N bonds unlike the spectra of the pure 2-MBI ligand, which shows only one peak in the N 1S region. The core level spectrum of S 2p shows the sulfide S2P$_{3/2}$ peak at 162.9 eV which corresponds to the formation of Cu—S bonds.

Figure 6A:
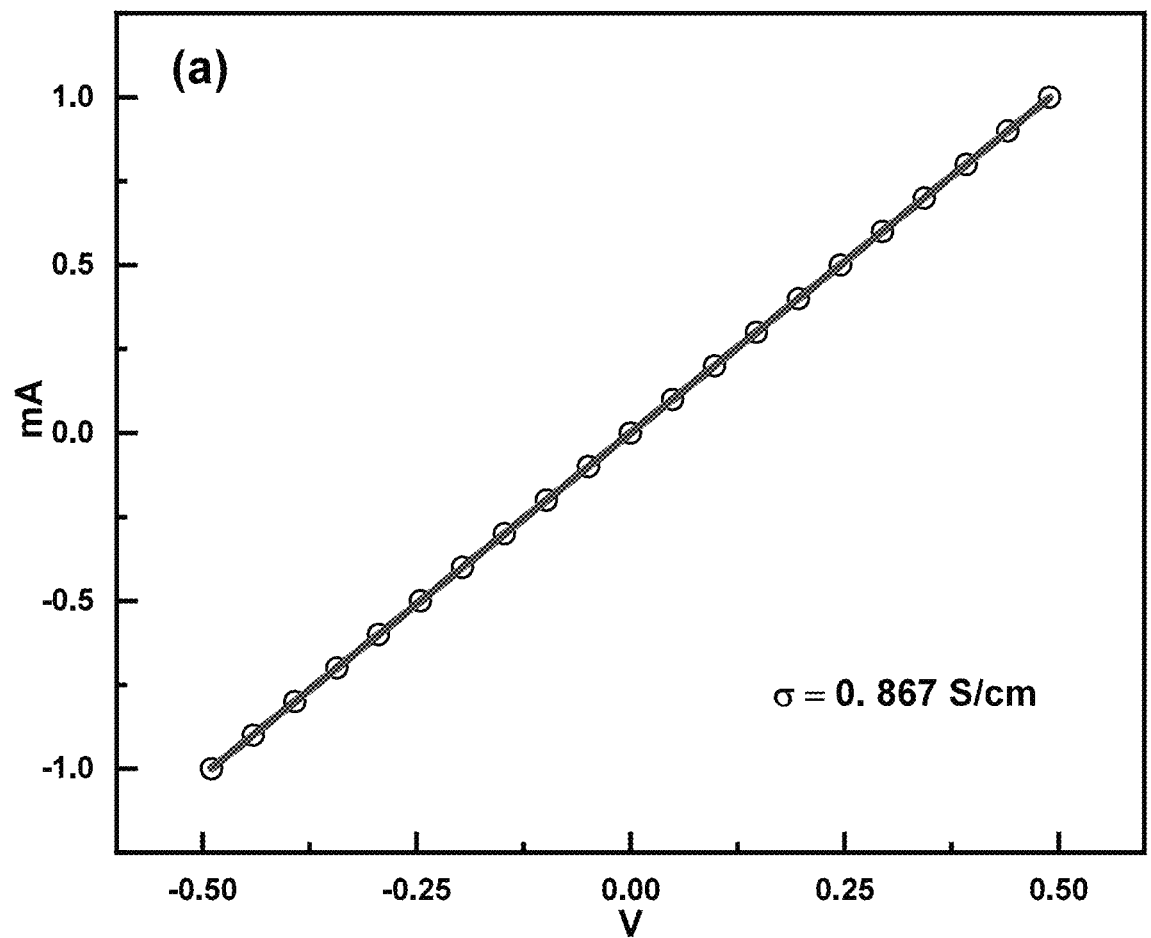
FIG. 6A is an I-V curve of MH-41 as example, in accordance with an embodiment.
Figure 6B:
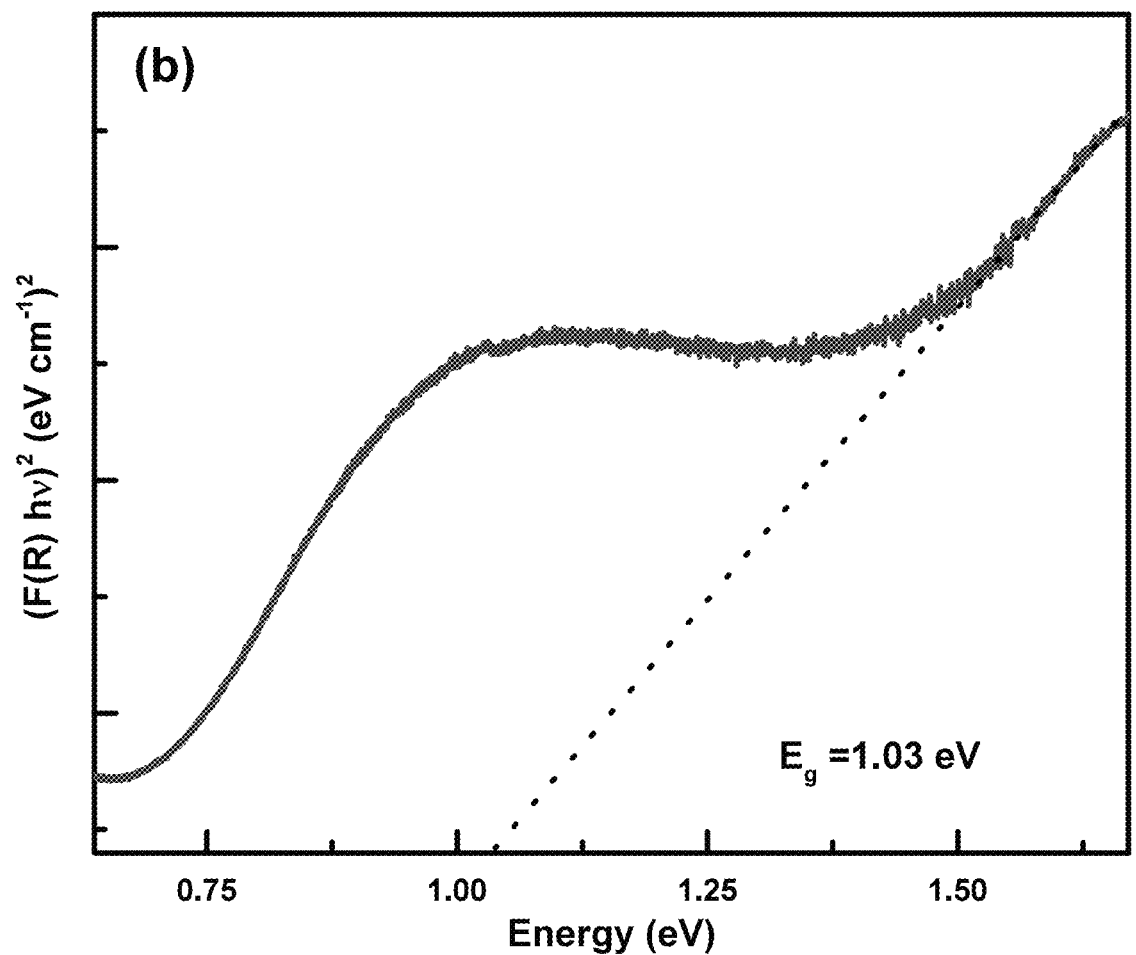
FIG. 6B is a Tauc plot of MH-41 as example, in accordance with an embodiment.

The electrical conductivity was measured at room temperature with the two-probe contact method. The devices were fabricated by contacting a piece of a rectangular-shape piece that was cut from MH-41 the free-standing film with two copper wires using conductive carbon paste. The linear I-V curve indicates an Ohmic behavior of MH-41 having a calculated conductivity value of 0.87 S·cm$^{-1}$ as seen in FIG. 6A. Fitting the onset of absorption spectrum in the Kubelka-Munk transformed UV-Vis spectral data revealed an optical bandgap of 1.03 eV, which is consistent with the good conductivity value of MH-41 as seen in FIG. 6B.

Figure 7A:
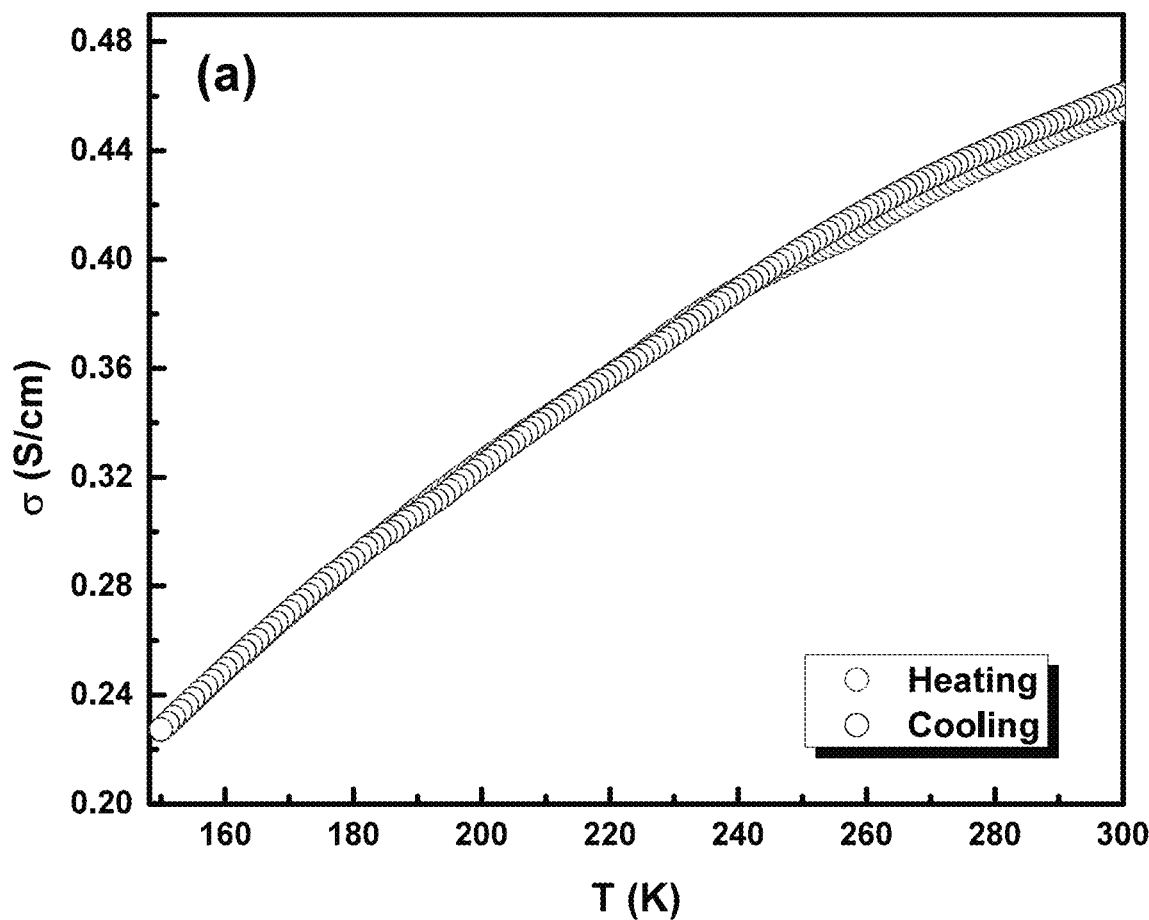
FIG. 7A is the temperature-dependent electrical conductivity measurement of MH-41 as example of conductivity measurement, in accordance with an embodiment.
Figure 7B:
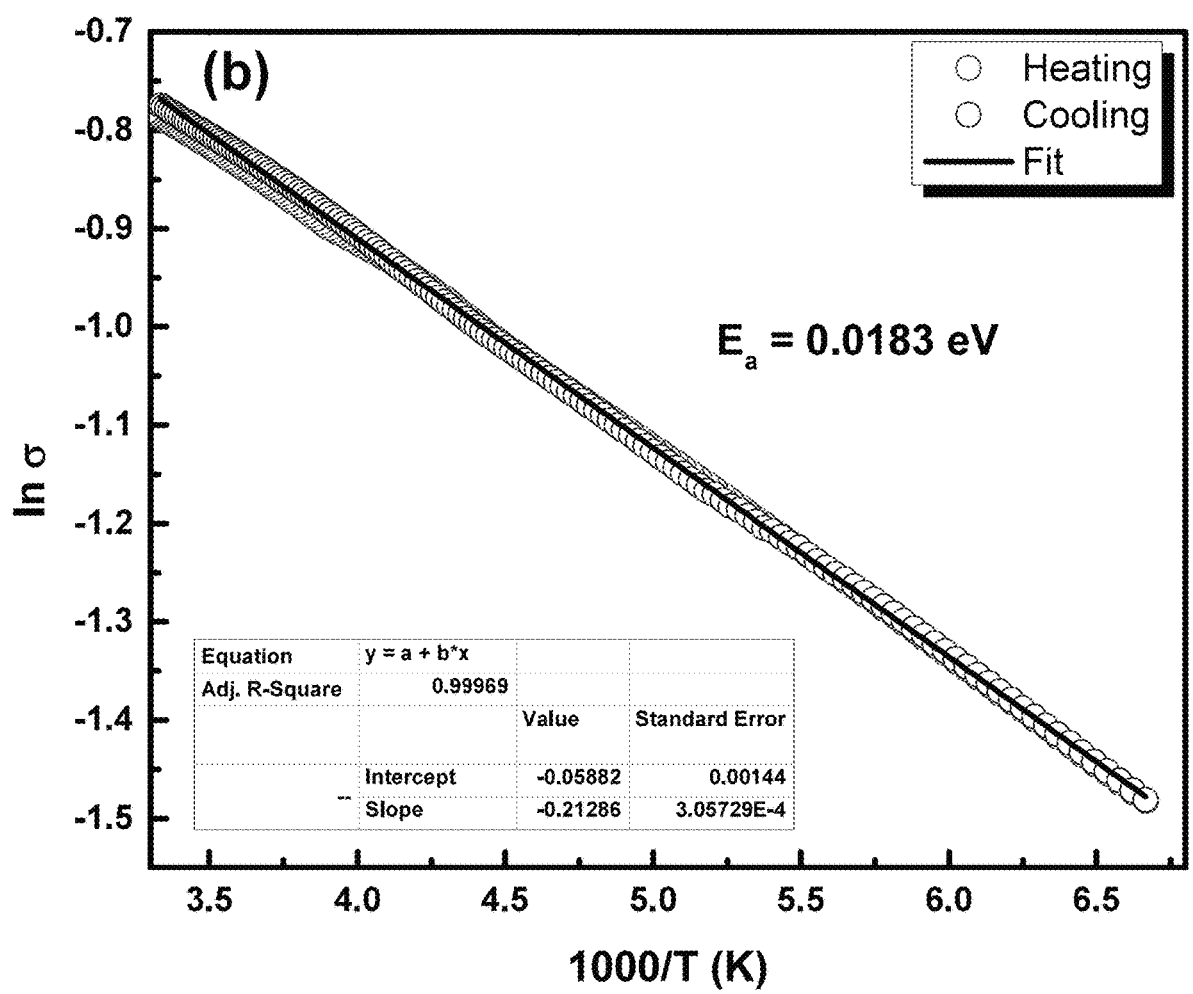
FIG. 7B is a Variable temperature conductivity of MH-41 with a linear fit to the Arrhenius equation for thermally activated transport as example of conductivity measurement, in accordance with an embodiment.

Variable-temperature conductivity measurement as seen in FIG. 7A and 7B was performed on a four-probe contact device under dynamic vacuum showing the semiconducting behavior of the material. This temperature dependence is explained by the promotion of valence band electrons to the conduction band with increasing temperature, which in turn increases the conductivity. The activation energy (Ea) is calculated by fitting the data between 150 and 300 K to the Arrhenius equation;

$$\sigma = \sigma_0 \exp(-E_a/K_b T)$$

Here, σ is the electrical conductivity, $\sigma_0$ is a prefactor, $K_b$ is the Boltzmann constant, and T is the absolute temperature. The calculated Ea value is 18.3 meV which is the lowest among semiconducting coordination polymers.

Figure 8A:
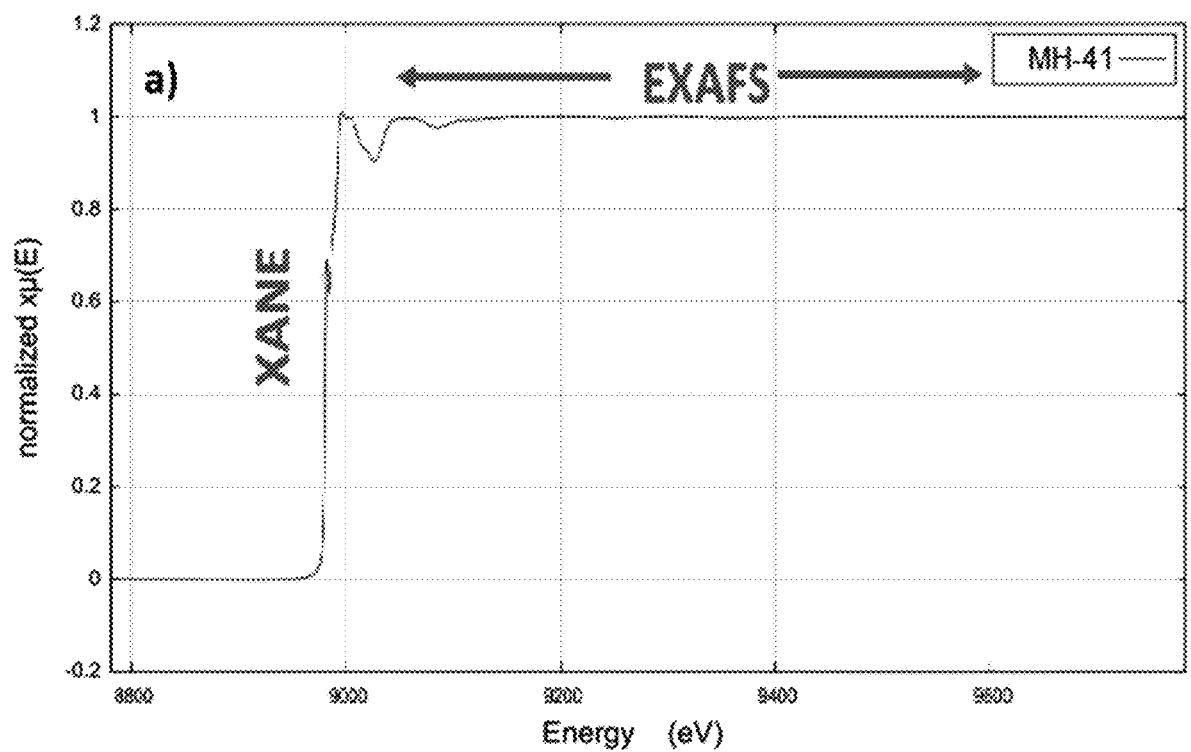
FIG. 8A is Cu K-edge XANES spectra of MH-41 in accordance with an embodiment.
Figure 8B:
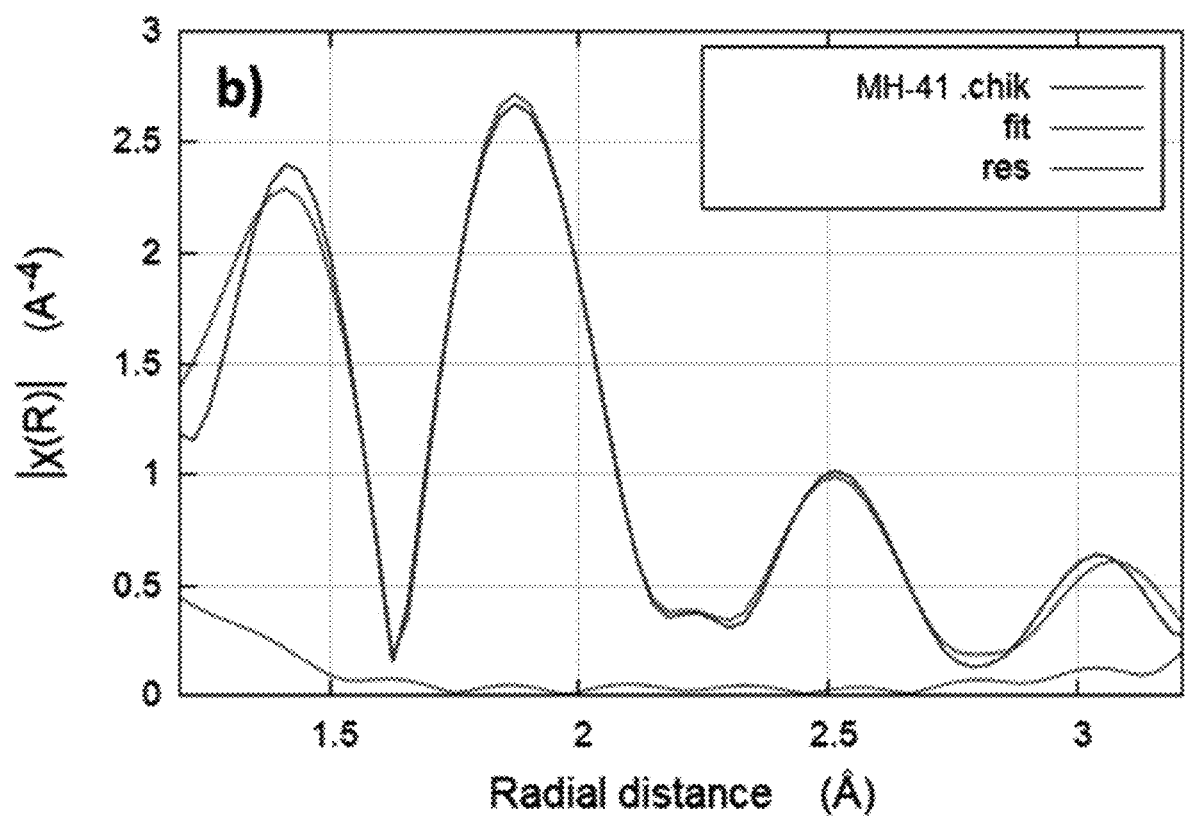
FIG. 8B is a phase-uncorrected FT EXAFS spectra from K2-weighted X(R) data in accordance with an embodiment.

Characterization using X-ray absorption spectroscopy (XAS), a widely used technique that uses synchrotron radiation to investigate the local structural and electronic configuration of atoms in solids and the X-ray absorption near edge structure (XANES) performed on Cu K-edge unveil the presence of Cu(I) indicated by the presence of the 8982.3 eV peak due to 1S→4P transition, as seen in FIG. 8A. Cu$^{2+}$ might be present in trace quantities. The Fourier-transform of EXAFS spectra shown in FIG. 8B indicates the presence of Cu, S, N at the first coordination shell around central Cu atom at distances indicated in Table 1 below:

TABLE 1

| Bond distances extrapolated from fitting the EXAFS spectra | | |
|---|---|---|
| Distance | R (A°) | delR |
| Cu—N1 | 1.85243 | 0.11007 |
| Cu—S1 | 2.27575 | 0.04085 |
| Cu—Cu1 | 2.81891 | 0.04631 |
| Cu—S2 | 3.31816 | 0.03046 |
| Cu—N2 | 3.31457 | 0.10953 |

Figure 9:
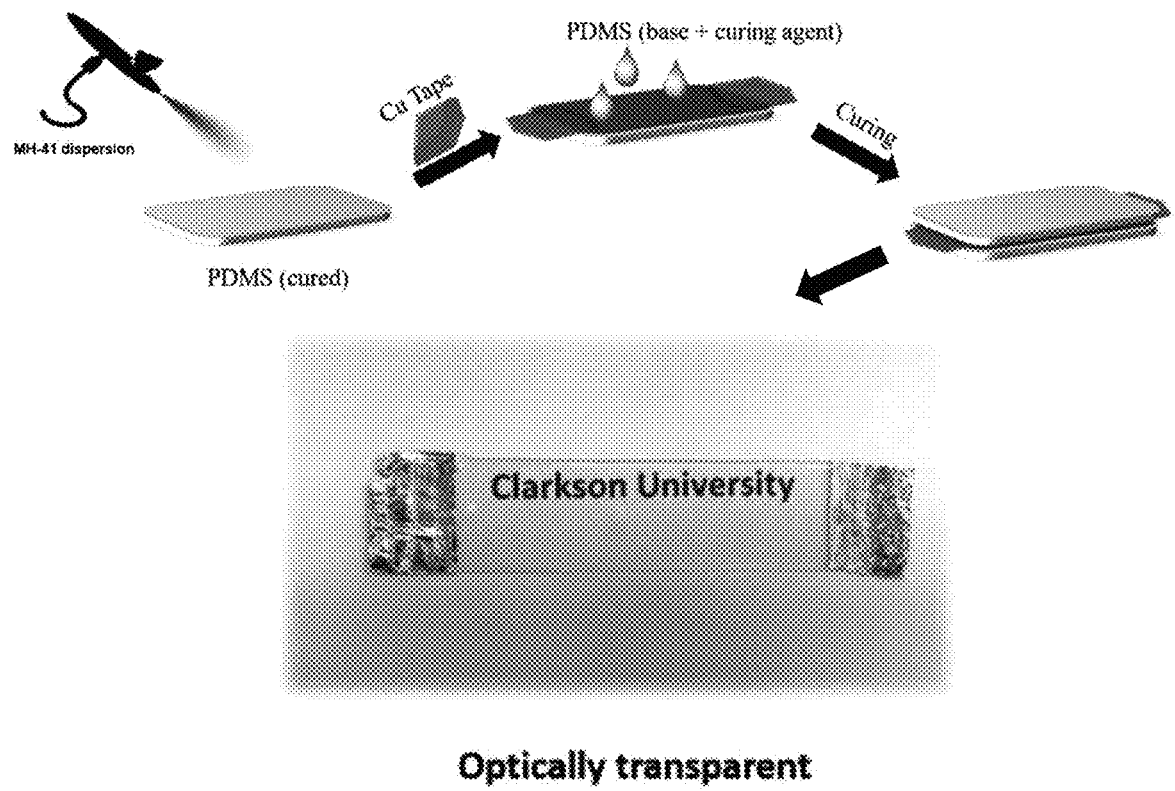
FIG. 9 is a schematic illustration for the preparation method of producing an optically transparent and flexible wearable device, in accordance with an embodiment.
Figure 9:
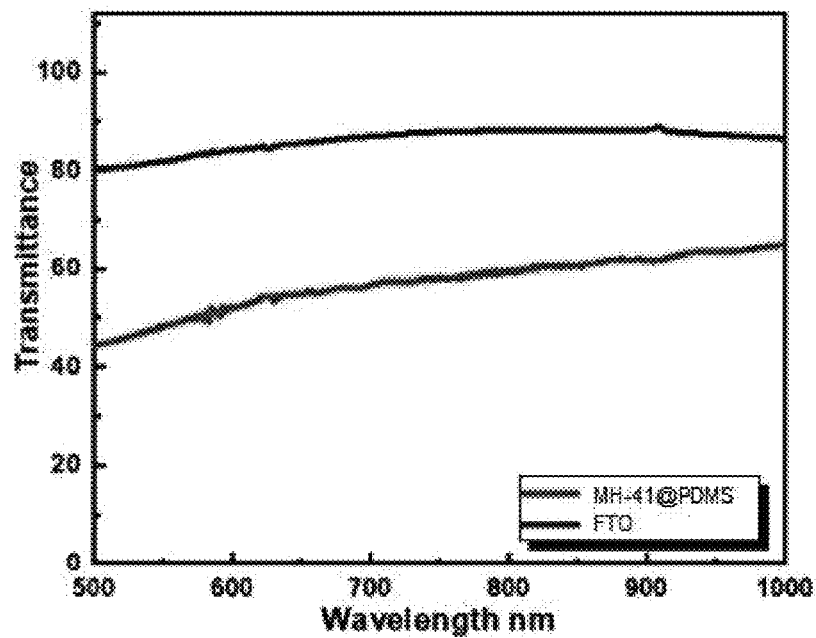

MH-41 can be easily dispersed in most polar low boiling point solvents such as ethanol. To assemble a device, a dispersion of MH-41 in an appropriate polar solvent is sprayed on film such as a cured thin PDMS elastomer, using a commercial airbrush kit. The PDMS elastomer was prepared by combining a 10:1 ratio of PDMS base (Sylgard 184, Dow Corning) to curing agent and subjected to dynamic vacuum until all the trapped air bubbles were removed. The mixture was placed in oven at 80° C. for 2 h to cure. The spayed MH-41 film was allowed to dry and two copper tape contacts where places at the ends of the device. Another PDMS mixture was poured over the MH-41 layer and the whole device was placed in oven at 80° C. for 2 h to cure. This flexible device is optically transparent as seen in FIG. 9, which is very useful for applications that requires such transparency.

Figure 10D:
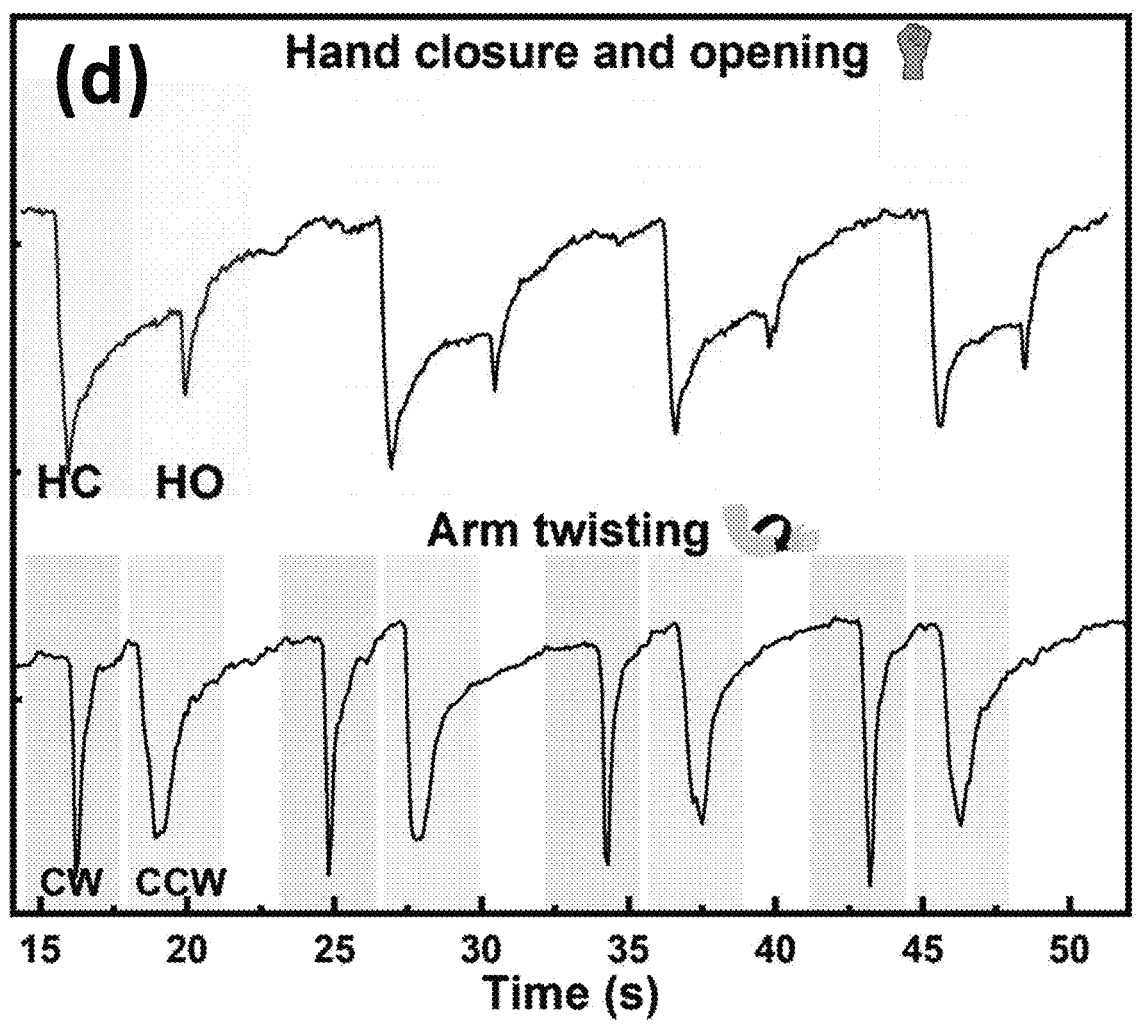
FIG. 10D is a graph of hand and arm movements while wearing an arm band containing threads treated with MH-41 in accordance with an embodiment.
Figure 11:
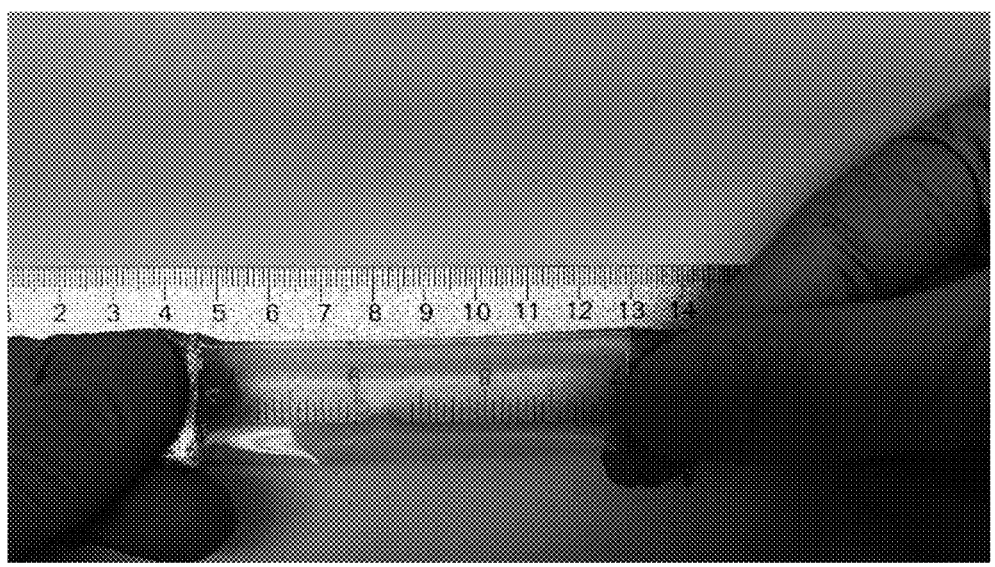
FIG. 11 are images illustrating the stretchability and transparency of a wearable device fabricated using MH-41, in accordance with an embodiment.
Figure 11:
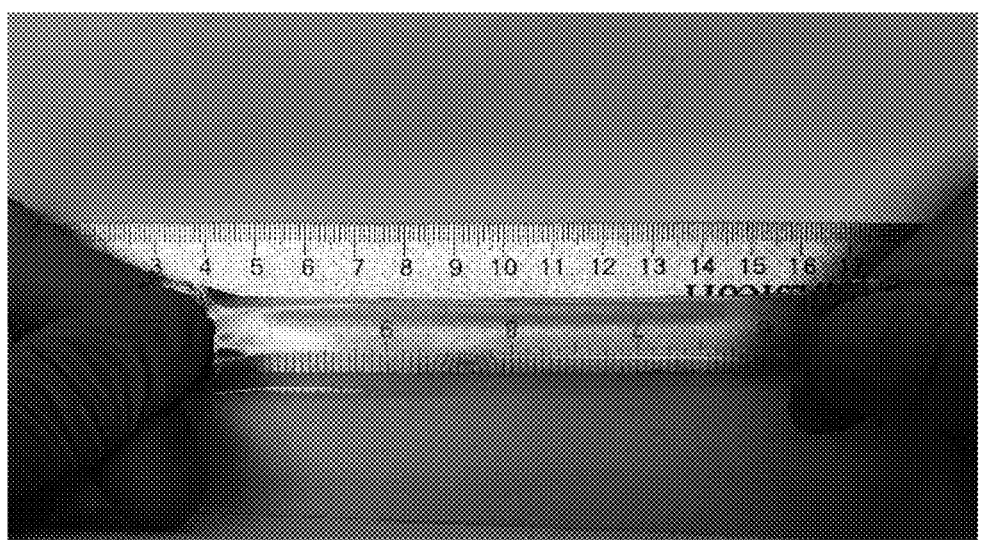

A device for tracking body motion by attaching e-textile prepared from MH-41 impregnation to a shoe insole while connecting it to a digital multimember through thin insulated copper wires. Body movements such as waking and running were tracked by measuring the current change over time, as see in FIG. 10A-C. The device shows distinct patterns in response to walking and running. Any small change in the movement pattern will be instantaneously transduced into a digital signal with an intensity that relies on the movement regime. This setup can be very useful for evaluating the change in movement pattern for patients who are at the risk of having diseases that affect their motor functions such as Parkinson's disease. Moreover, it can be used to wirelessly track athletes' movements during games. We used this device to track the movement of other body parts such as hand closure and opening. As shown in FIG. 10D, both hand closure and opening generate distinct potential spike with an intensity that depends on the extent of the movement. The flexibility and stretchability of this device was maintained after storage for about 12 months, as seen in FIG. 11. This work represents a step towards the design of a tactile sensor with a touch feedback for prosthetic implants.

Figure 12:
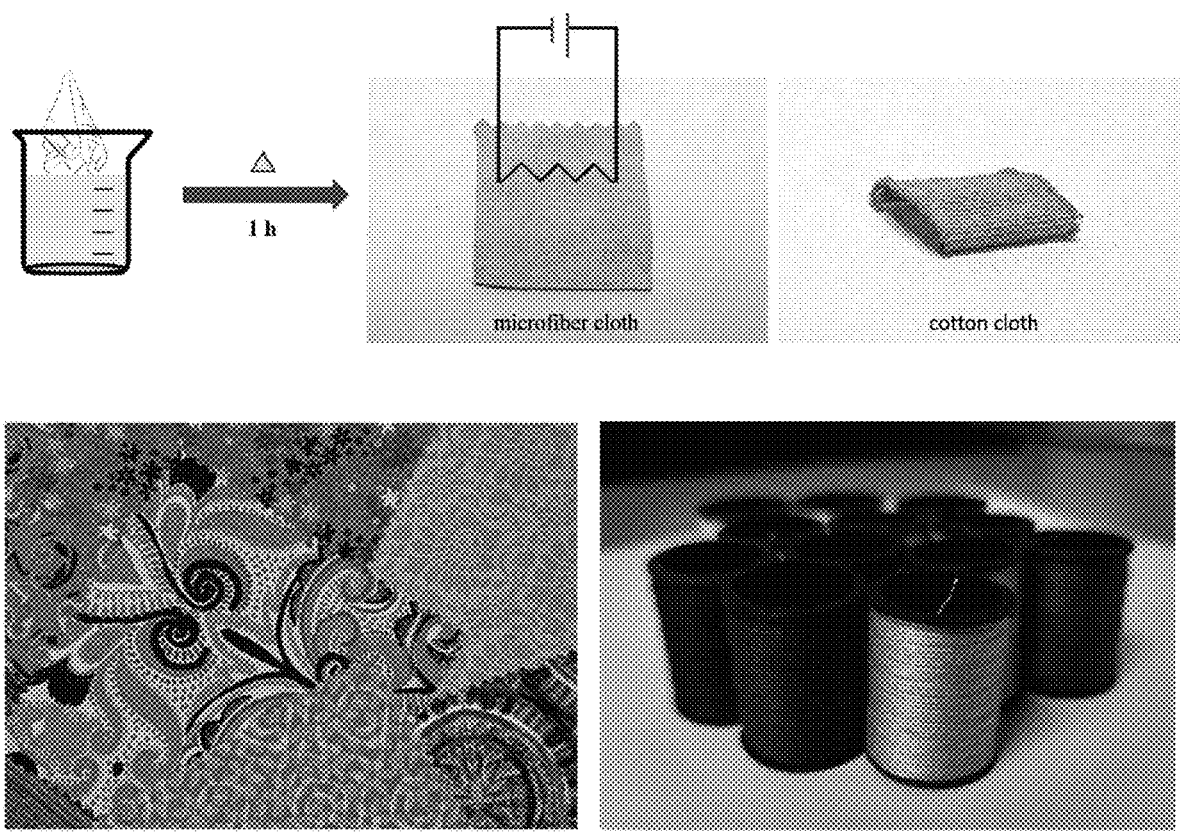
FIG. 12 is a schematic illustration for the preparation method of e-textiles and e-threads that have an electrical response upon applying pressure in accordance with an embodiment.

In other embodiments, MH-41 is incorporated in different types of textiles in which the fabric or textile is exposed to the precursors and the synthesis is performed in situ. As an example, a piece of textile is added to coordination polymer precursors' solution, and placed in oven at 85° C. for 1 h to produce an e-textile. The e-textiles washed several times with ethanol and dried showed a good electrical conductivity with a resistivity value of about 60 K$\Omega$ cm$^{-1}$ as seen in FIG. 12.

One of the many advantages of this polymer is its fibrous structure which made it amenable to integration into textiles. The fibers can coat the textile threads very well and they do not leach or flake upon moving the textile unlike other materials with micro/nano particle morphology. As a proof of concept, we tested the electrical response of these e-textiles upon applying pressure on them (hand squeezing) and upon exposure to ammonia gas. An Arduino circuit with an LED light indicator was assembled to sense the resistance change and connected to the e-textile with crocodile clamps. Upon applying pressure, the signal is transduced into a change in electrical resistance and in turn lights the LED. This change was ascribed to the effect of pressure on the contact distance between the neighboring fiber bundles, which affects electron transfer across the fibers.

EXAMPLE 1

The synthesis of MH-41 (Cu-MBI) is performed by mixing Cu(NO$_3$)$_2$·3H$_2$O (48.32 mg, 0.2 mmol) dissolved in 2.5 ml DMF and 0.5 ml water with 2-mercaptobenzimidazole (MBI, 30 mg, 0.2 mmol) dissolved in 2.5 ml DMF and 0.5 ml water. The vial containing the clear solution is sealed and placed in oven at 85° C. for 2 hours. The produced teal precipitate is washed with DMF, water, and ethanol then dried in oven at 85° C.

EXAMPLE 2

This example describes the preparation, incorporation and use of the MH-41 as a gas sensing platform. The MH-41 was incorporated within threads. Both are used as a gas responsive e-textile that changes electrical properties reversibly upon exposure to corrosive gases such as ammonia due to the reversible interaction between ammonia and metal in the polymer. A reversible interaction between the e-textile and ammonia gas yielded a change in current. This textile can be stitched in a shirt with electrically conductive threads and connected to a miniaturized control circuit that can wirelessly transmit the produced signals in response to certain gases.

EXAMPLE 3

This example describes the use of the new conducing polymer as a building block for conductive textiles and wearable electronics for applications such as: 1) body motion monitoring, 2) pressure sensing and 3) e-textile for chemical sensing. MH-41 was deposited onto a standalone device of a clothing and their response to motion, pressure or gas was monitored.

Body motion monitoring: MH-41@PDMS used as a flexible device or platform placed within different areas of the body to accurately determine and quantify the change in the signal in response to various types of motions. For instance, the electrical response of the device towards walking/running regime related to the person's body weight, the speed of hand closure/opening motions related to the shape and intensity of the electrical signal.

Biochemical monitoring: MH-41@textiles used for monitoring biomarkers in biological fluids such as sweat analysis wearable sensors by measuring, for example, glucose and lactate levels. The function of this polymer in such devices in addition to providing conductivity will be to enable the immobilization of biological receptors such as enzymes and/or nanoparticles to facilitate signal transduction and recognition processes at the electrode surfaces.

EXAMPLE 4

To make conducive fabric (MH-41@textiles and MH-41@threads), any commercially available textiles or threads are placed in the MH-41 precursor solution as described in Example 1 and placed in oven at 85° C. for 2 hours. After forming the teal product, the textiles or threads are removed, washed with water and ethanol several times to remove the physically adsorbed MH-41 precipitate form the surface.

EXAMPLE 5

Figure 13:
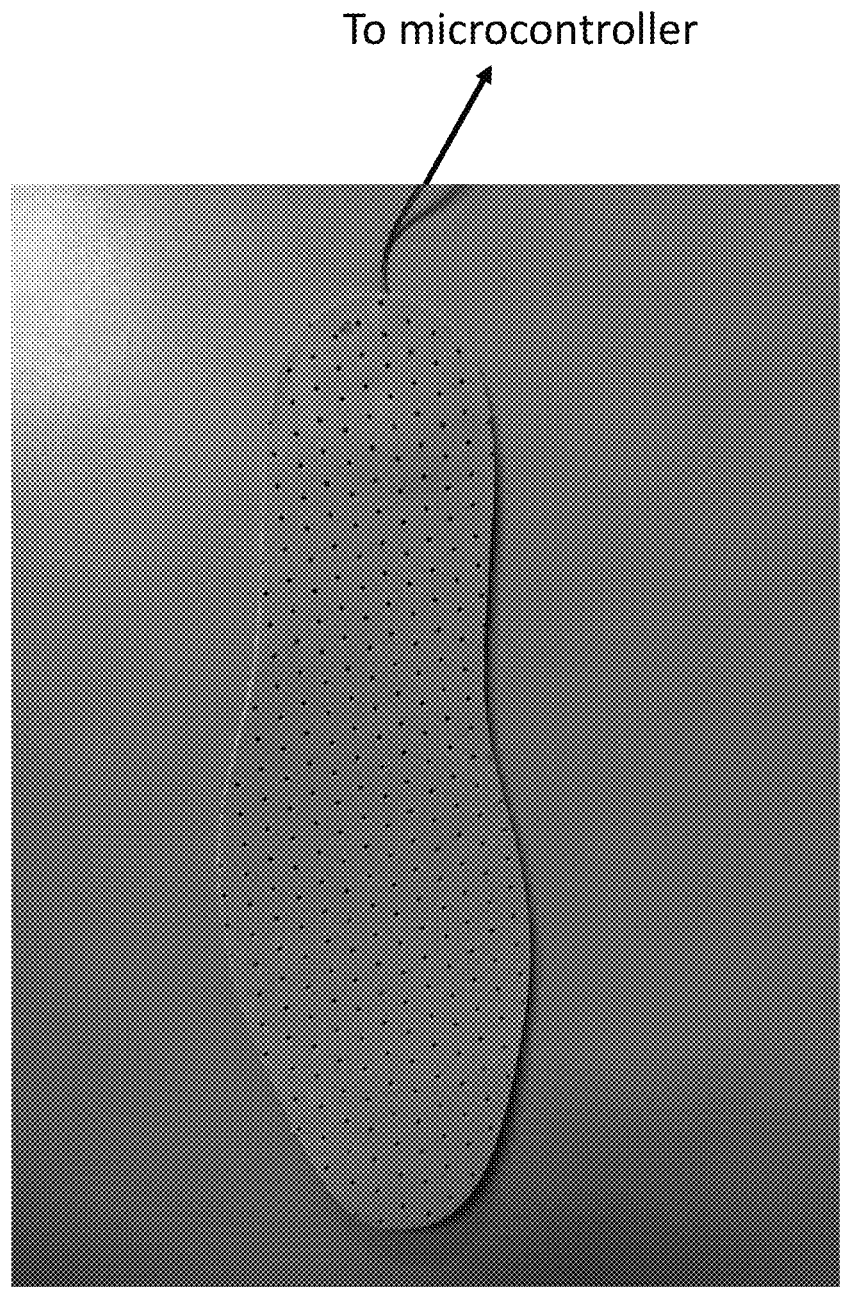
FIG. 13 shows a pressure sensitive shoe insole made by imbedding MH-41@threads in the insole and connected to a wireless microcontroller.

Pressure sensitive shoe insole and socks FIG. 13: MH-41@threads used for monitoring foot pressure distribution and suitable for gait analysis. MH-41@threads are stitched on different places between the layers of a commercially available shoe insole and connected to a portable microcontroller with/without a multiplexer breakout and a Bluetooth or Wi-Fi modules. Same procedure for making a pressure sensitive socks at which MH-41@threads are stitched at the bottom of the sock and connected to the wireless microcontroller.

EXAMPLE 6

Antistatic coatings and electromagnetic shielding: This example describes the use of the conducing polymer as a coating for imparting antistatic and electromagnetic shielding properties to surfaces such as glass, plastic, fabrics, etc.

EXAMPLE 7

MH-41 is doped with redox active metal by dispersing a suitable amount of the polymer in ethanol with an equivalent amount of the redox active metal salt under stirring for at least 1 hour. For example, H₂PtCl₆ mg and MH-41 (20 mg) are sonicated in 10 ml ethanol for 5 minutes and stirred at room temperature for 1 hour. The precipitate is washed with plenty of water and ethanol before being dried in oven at 85° C. for 2 hours.

EXAMPLE 8

Another ligand from the previously mentioned ones may be employed in the formation of a conducive coordination polymer. For instance, CuCl₂·H₂O (34.1 mg, 0.2 mmol) dissolved in 5 ml ethanol is mixed with Thiosalicylic acid (61.7 mg, 0.4 mmol) dissolved in 5 ml ethanol. The solution is refluxed for 2 hours producing a yellow precipitate that turns black on air exposure. The powder is washed with ethanol and dried in oven at 85° C. A pellet is formed by pressuring 100 mg of the powder in a press die and performing a two-contact probe measurement. A conductivity value of 0.2 mS·cm⁻¹ was recorded.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An electrically conductive material, comprising:
a substrate; and
a plurality of thiolated ligands coordinated with a plurality of metal ions applied to the substrate, wherein each of the plurality of metal ions is coordinated with at least one of the plurality of ligands to form a conductive fiber network, and wherein each of the plurality of thiolated ligands comprise a thiolated molecule having the structure selected from the group consisting of

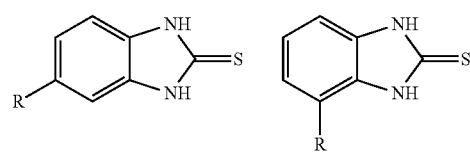

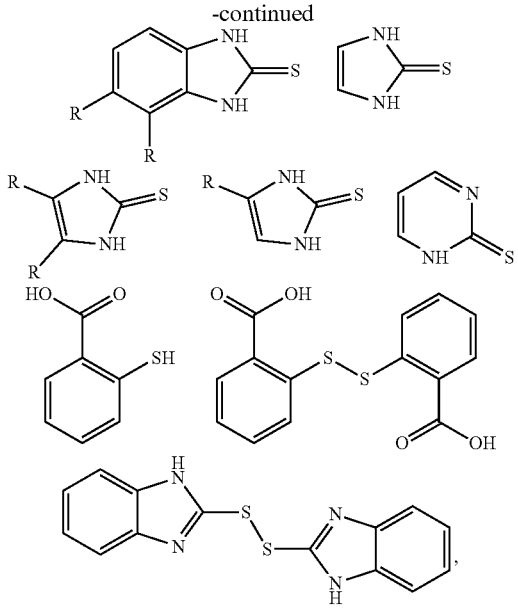

where R is selected from the group consisting of hydrogen, NO₂, R', F, Cl, Br, I, CN, NC, SO₃R', SO₃H, OR', OH, SR', SH, PO₃R', PO₃H, CF₃, CH₃, CO₂H, NR'₂, NHR', and NH₂; and R' is selected from the group consisting of NO₂, F, Cl, Br, I, CN, NC, SO₃H, OH, SH, PO₃H, CF₃, CH₃, CO₂H, NH₂, a substituted alkyl, and a substituted aryl,
wherein the substrate comprises a layer of an elastomer and the conductive fiber network is applied to a surface of the elastomer.

2. The material of claim 1, wherein the plurality of thiolated ligands are selected from the group consisting of 2-mercaptobenzimidazole, 5-amino-2-mercaptobenzimidazole, 2-mercaptoimidazole, and 2-mercaptopyrimidine.

3. The material of claim 1, wherein the plurality of metal ions are selected from the group consisting of Mg²⁺, Mn²⁺, Fe²⁺, Co²⁺, Ni²⁺, Cu⁺, Cu²⁺, Pd²⁺, Pt²⁺, Ru²⁺, Cd²⁺, Zn²⁺, Pb²⁺, Hg²⁺, V²⁺, Cr²⁺, and Ni⁺².

4. The material of claim 1, wherein the plurality of metal ions are selected from the group consisting of Fe³⁺, V³⁺, Ti³⁺, Sc³⁺, Al³⁺, In³⁺, Ga³⁺, Mn³⁺, Co³⁺, and Cr³⁺.

5. The material of claim 1, wherein the plurality of thiolated ligands comprise 2-mercaptobenzimidazole (2-MBI) and the plurality of metal ions comprise copper ions.

6. The material of claim 1, further comprising a second elastomer, wherein the second elastomer is applied over the conductive fiber network.

7. The material of claim 1, wherein the substrate comprises a textile fiber.

8. The material of claim 1, further comprising a first conductive lead attached to a first end of the substrate and in contact with the conductive fiber network and a second conductive lead attached to a second end of the substrate and in contact with the conductive fiber network.

9. The material of claim 7, further comprising a detector coupled to the first conductive lead and the second conductive lead and configured to detect any changes in the electrical conductivity of the conductive fiber network.

10. The material of claim 8, wherein the electrical conductivity of the conductive fiber network will change in response to contact between the conductive fiber network and a gas.

11. The material of claim 8, wherein the electrical conductivity of the conductive fiber network will change in response to motion.

12. The material of claim 8, wherein the electrical conductivity of the conductive fiber network will change in response to pressure.

13. The material of claim 8, wherein the electrical conductivity of the conductive fiber network will change in response to contact with a fluid.

14. A method of producing an electrically conductive material, comprising the steps of:
   providing a plurality of thiolated ligands;
   coordinating a plurality of metal ions to the plurality of thiolated ligands to form a conductive fiber network; and
   applying the conductive fiber network to a substrate, wherein each of the plurality of thiolated ligands comprise a thiolated molecule having the structure selected from the group consisting of

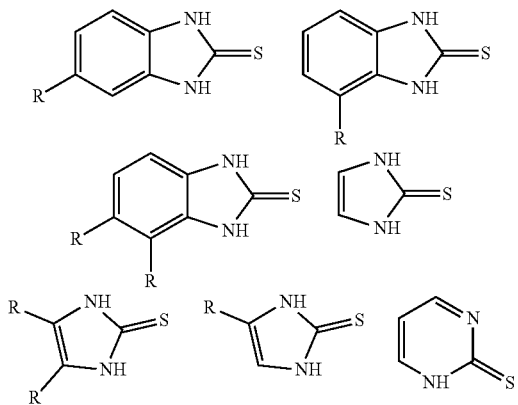

-continued

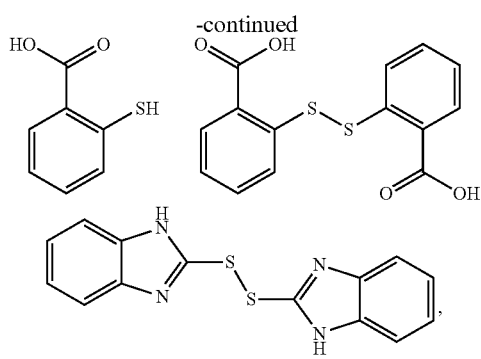

where R is selected from the group consisting of hydrogen, $NO_2$, R', F, Cl, Br, I, CN, NC, $SO_3R'$, $SO_3H$, OR', OH, SR', SH, $PO_3R'$, $PO_3H$, $CF_3$, $CH_3$, $CO_2H$, $NR'_2$, NHR', and $NH_2$; and R' is selected from the group consisting of $NO_2$, F, Cl, Br, I, CN, NC, $SO_3H$, OH, SH, $PO_3H$, $CF_3$, $CH_3$, $CO_2H$, $NH_2$, a substituted alkyl, and a substituted aryl, and wherein the substrate comprises a layer of an elastomer and the step of applying the conductive fiber network to the substrate comprises the step of spraying the conductive fiber network to a surface of the elastomer.

15. The method of claim 14, wherein the plurality of thiolated ligands are selected from the group consisting of 2-mercaptobenzimidazole, 5-amino-2-mercaptobenzimidazole, 2-mercaptoimidazole, and 2-mercaptopyrimidine.

16. The method of claim 14, further comprising the step of applying a second elastomer is applied over the conductive fiber network.

17. The method of claim 14, further comprising the step of measuring the electrical conductivity of the conductive fiber network.

* * * * *